Feb. 10, 1959 E. E. ROBINSON 2,873,420
EXCITATION MEANS FOR ALTERNATING ELECTRIC CURRENT GENERATORS
Filed March 22, 1957
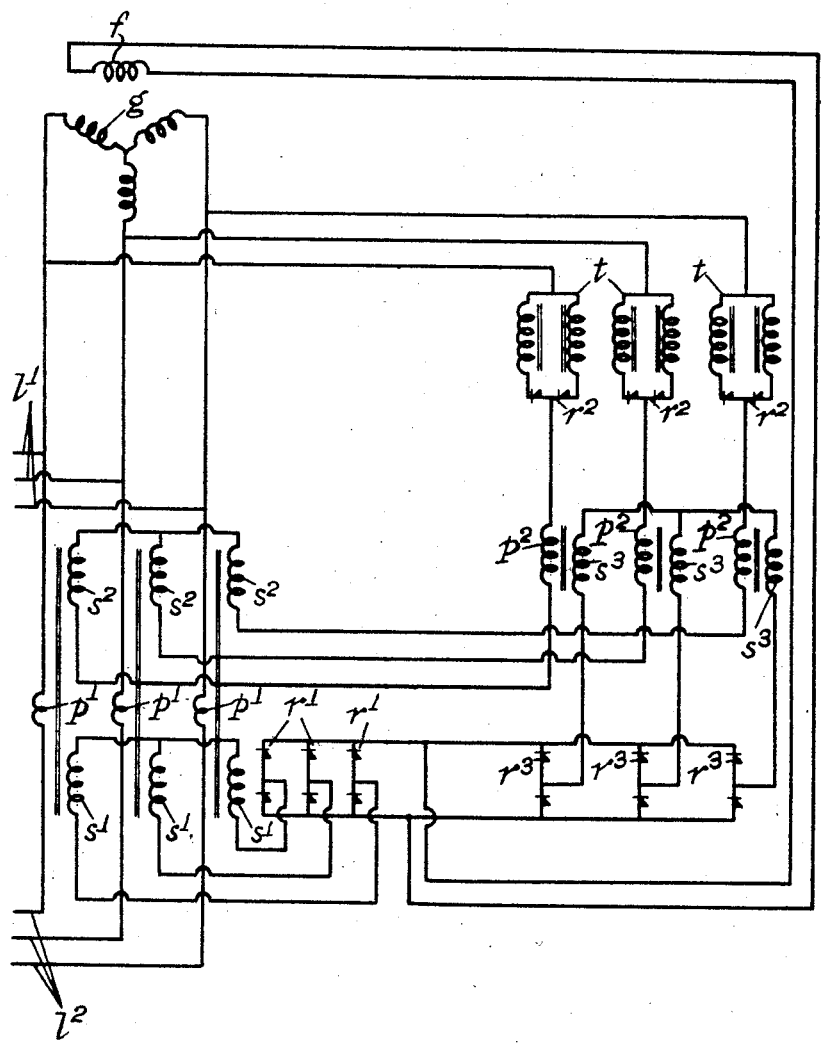
Inventor
E. E. Robinson

United States Patent Office 2,873,420
Patented Feb. 10, 1959

2,873,420

EXCITATION MEANS FOR ALTERNATING ELECTRIC CURRENT GENERATORS

Eric Ernest Robinson, North Wembley, England, assignor to Rotax Limited, London, England Application March 22, 1957, Serial No. 647,881

1 Claim. (Cl. 322—27)

This invention relates to alternating electric current systems of the kind in which the excitation current of the generator is supplied through a transductor and rectifier, the generator being designed to deal with a given normal load on the system.

The object of the invention is to enable the same generator to deal with an occasional additional load of short duration in a branch circuit where it is necessary to employ a generator which is suitable only for dealing with the normal load.

The invention comprises the combination with the branch circuit, of a current transformer and rectifier for injecting into the generator field circuit a supplementary current at a higher voltage than that of the normal excitation current, and means for boosting the voltage of the current supplied by the transductor.

In one manner of applying the invention, as illustrated by the accompanying diagram, to a 3-phase system the latter includes a main-load circuit $l^1$ and a temporary-load branch circuit $l^2$ both being supplied by a generator $g$. The field winding $f$ of the generator is energised by a 3-phase transductor $t$ provided with regulating windings (not shown) adapted to vary the action of the transductor in response to variations of the generator voltage.

Between the generator and the temporary-load circuit are connected the primary windings $p^1$ of a 3-phase current transformer, and the secondary windings $s^1$ of this transformer are connected to the field winding $f$ through rectifiers $r^1$, the said transformer being adapted to inject into the generator field system a supplementary current sufficient to enable the generator to deal with an occasional transient load in the branch circuit $l^2$. Also on the said transformer are provided additional secondary windings $s^2$ for supplying current to the primary windings $p^2$ of a 3-phase voltage transformer connected in series with the transductor $t$ as shown. The latter and the secondary windings $s^3$ of the said transformer are connected to the field winding $f$ through recetifiers $r^2$, $r^3$. The purpose of the secondary windings $s^2$ is to boost the transductor voltage sufficiently to maintain the normal excitation current in action when the transient load occurs and prevent a temporary drop in the normal current when the transient load terminates. Alternatively the boosting of the transductor voltage may be effected by an independent 3-phase transformer having secondary windings corresponding to the windings $s^2$, and energised by primary windings in series with the windings $p^1$.

Having thus described my invention what I claim as new and desire to secure by Letters Patent is:

An alternating electric current system comprising in combination a generator designed to deal with a given normal load, normal-load main circuital means, temporary-load branch circuital means connected to the main circuital means, exciting-current circuital means, the generator being connected to the main circuital means for supplying current to both the main and branch circuital means, and having a field winding forming a part of the exciting-current circuital means, a transductor connected to and energisable by current from the generator, rectifier means connected between the transductor and the exciting-current circuital means for enabling the latter to be supplied with exciting current through the transductor, a current transformer energisable by current supplied by the generator to the branch circuital means, rectifier means connected to the current transformer and exciting-current circuital means for enabling the current transformer to inject into the exciting-current circuital means a current at a higher voltage than that supplied to the exciting-current circuital means through the transductor, and thereby enable the generator to deal with an occasional transient load through the branch circuital means, and means energisable by current supplied by the generator to the branch circuital means for boosting the voltage of the current supplied through the transductor to the exciting-current circuital means during the injection into the latter of current from the transformer.

References Cited in the file of this patent

UNITED STATES PATENTS

| | | |
|---|---|---|
| 2,075,105 | Evans | Mar. 30, 1937 |
| 2,236,880 | Perry | Apr. 1, 1941 |